(12) United States Patent
Campbell

(10) Patent No.: US 6,944,475 B1
(45) Date of Patent: Sep. 13, 2005

(54) TRANSCEIVER-PROCESSOR BUILDING BLOCK FOR ELECTRONIC RADIO SYSTEMS

(75) Inventor: Michael E. Campbell, San Diego, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 339 days.

(21) Appl. No.: 09/651,754

(22) Filed: Aug. 30, 2000

(51) Int. Cl.[7] ............................ H04M 1/00; H04B 1/38
(52) U.S. Cl. .................... 455/553.1; 455/73; 455/90.2; 455/90.1; 455/431
(58) Field of Search .......................... 455/73, 98, 90.2, 455/90.1, 550.1, 552.1, 553.1, 131, 161.1, 165.1, 84, 86, 82, 558, 442, 432.1, 313, 426.1, 83, 418, 431; 375/259, 316, 295, 219, 340; 340/10.1; 342/37

(56) References Cited

U.S. PATENT DOCUMENTS

| | | | | |
|---|---|---|---|---|
| 5,212,804 A | | 5/1993 | Choate ........................ | 455/431 |
| 5,280,636 A | * | 1/1994 | Kelley et al. ................ | 375/240 |
| 5,640,694 A | * | 6/1997 | Milton, Jr. .................... | 342/57 |
| 5,712,628 A | * | 1/1998 | Phillips et al. ............ | 340/10.51 |
| 5,859,878 A | * | 1/1999 | Phillips et al. .............. | 375/316 |
| 5,867,535 A | * | 2/1999 | Phillips et al. .............. | 375/295 |
| 5,898,683 A | | 4/1999 | Matsumoto et al. ........ | 370/338 |
| 6,002,924 A | * | 12/1999 | Takano ..................... | 455/161.1 |
| 6,072,994 A | * | 6/2000 | Phillips et al. .............. | 375/219 |
| 6,147,980 A | * | 11/2000 | Yee et al. .................... | 370/316 |
| 6,343,207 B1 | * | 1/2002 | Hessel et al. ................ | 455/552 |
| 6,353,846 B1 | * | 3/2002 | Fleeson ....................... | 718/104 |
| 6,389,078 B1 | * | 5/2002 | Hessel et al. ................ | 375/259 |
| 2003/0194996 A1 | * | 10/2003 | Campbell .................... | 455/431 |
| 2004/0087283 A1 | * | 5/2004 | Jones et al. .................. | 455/132 |

OTHER PUBLICATIONS

Harris, "Modular Avionics: Its Impacts on Communication, Navigation, and Identification (CNI)", Proceedings of the IEEE National Aerospace and Electronic Conference, NAECON '88, vol. 3, pp. 1164–1169, May 23–27, 1988.*

Bryson, "Integrated CNI Terminal Software Architecture", Proceedings of the IEEE National Aerospace and Electronic Conference, NAECON '89, vol. 4, pp. 1713–1721, May 22–26, 1989.*

Wolfe et al., "Integrated CNI Avionics Using F–22 Modular Products", Proceedings of the IEEE National Aerospace and Electronic Conference, NAECON '96, vol. 1, pp. 264–271, May 20–23, 1996.*

* cited by examiner

*Primary Examiner*—Rafael Perez-Gutierrez
(74) *Attorney, Agent, or Firm*—Noel F. Heal

(57) ABSTRACT

A transceiver-processor building block (700) for implementation of radio systems, an example being used in an electronic radio system multifunction slice, includes several transceivers (704–710), a processor connected to the transceivers (702), and a local RF control bus (726) coupled between the processor (702) and the transceivers (704–710). A radio network bus (716) is also provided and connected to the processor (702). The local RF control bus (726) is inaccessible directly from outside the multifunction slice. In contrast, the radio network bus (716) is accessible directly from outside the multifunction slice to allow "stacking" of multiple slices. The building block (700) may also include an external control bus (728) connected to the processor (702). An external control bus connector (730) then provides direct accessibility to the external control bus (728) from outside the multifunction slice.

21 Claims, 8 Drawing Sheets

TRANSCEIVER-PROCESSOR BUILDING BLOCK FOR ELECTRONIC RADIO SYSTEMS

This application is related to U.S. patent application Ser. No. 09/651,752, filed on Aug. 30, 2000, now abandoned in favor of a continuation having application Ser. No. 10/446,344, filed on May 28, 2003, and U.S. application Ser. No. 09/651,757, filed on Aug. 30, 2000, now abandoned in favor of a continuation having application Ser. No. 10/606,107, filed on Jun. 25, 2003.

BACKGROUND OF THE INVENTION

The present invention relates to avionics and electronic radio systems. In particular, the present invention relates to a transceiver-processor building block for an electronic radio system.

Military aircraft require an electronic radio or CNI avionics system capable of implementing three important classes of functions: communications, navigation and identification (CNI). Communications functions include, for example, communicating over a voice radio and interfacing into a data network; navigation functions include, for example, receiving input radio beacons, Instrument Landing System indicators and the global positioning system (GPS); identification functions include, for example, friend-or-foe interrogation. In the case of civilian aircraft, where identification functions are not required, surveillance functions are typically substituted. Surveillance functions include, for example, identification, and position and flight path determination of other aircraft. Communication functions, navigation functions, identification functions, and surveillance functions are generally referred below as the radio functions of an electronic radio system. However, this invention is not limited to just communication, navigation and identification (e.g., electronic warfare). In the past, a predetermined set of independent resource assets implemented a typical radio function. Resource assets include, for example, antennas, antenna preconditioning units, transceivers (or transmitters and receivers), transmitters, modems (or modulators and demodulators), digital signal processors, amplifiers, microphones, headsets, and the like. Thus, a voice channel reception radio function might be implemented using an antenna, an antenna preconditioning unit, a preselection filter/amplifier, a receiver, a demodulator, a digital to analog converter, and a headset. The resource assets were dedicated as a point design to the particular radio function that the resource assets were designed to perform.

In other words, prior electronic radio systems were developed using point design architectures that were unique to the radio functionality being provided. Each radio function required a separate dedicated architecture that lead to a fixed design that was difficult to modify, for example, for performance upgrades, capability additions, and technology enhancements. As the total number of radio functions increased that the aircraft was required to perform, so did the complexity and the size, weight, and power requirements of the electronic radio system as a whole. However, the need to limit the size, weight, and power requirements in an aircraft is paramount.

Aircraft, and in particular military aircraft, commonly have their flight plans (called mission, such as, Close Air Support, CAS) broken up into units referred to as mission segments. Commonly, during any given mission segment, the aircraft exercises only a predetermined subset of the radio functions that the aircraft supports. As examples, missions segments may include "Departure and Recovery", during which a first subset of radio functions operate, "Air-to-Air Combat and Ground Attack", during which a second subset or radio functions operate, and "Safe Return to Base", during which a third subset or radio functions operate. Although the aircraft uses only a subset of all its radio functions during a mission segment, past electronic radio system designs often required the aircraft to carry all of the resource assets necessary to provide the full set of radio functions at all times.

The path that radio function data takes through the resource assets that support that radio function is referred to as a function thread. For example, a VHF voice reception radio function thread may start at a VHF antenna, continue through a VHF antenna interface unit, a VHF receiver, a signal processor, and finally a headset. One disadvantageous aspect of prior design techniques was that radio function threads were formed using independent sets of resource assets. In other words, resource assets were not shared based upon the radio function requirements for the post, current, and future mission segment, thereby leading to the over-inclusion of resource assets to realize the electronic radio system.

In an effort to limit the size, weight, and cost of a electronic radio system, a building block approach was developed. Each building block was capable of performing a portion of the processing required by several different radio functions. However, many different types of building blocks existed. Thus, while an electronic radio system built using the wide variety of building blocks was able to share common installation, packaging and infrastructure resources, the resulting integrated control and data routing created complex interdependencies between radio functions. The interdependencies further complicated the development cycle, and increased the potential for unexpected impact on existing radio functions as a result of repair, replacement, or upgrade of another radio function.

A need has long existed in the industry for a transceiver-processor building block for an electronic radio system that addresses the problems noted above and others previously experienced.

BRIEF SUMMARY OF THE INVENTION

A preferred embodiment of the present invention provides a transceiver-processor building block for an electronic radio system multifunction slice. The building block includes several transceivers, a processor connected to the transceivers, and a control and data transfer bus architecture. The bus architecture includes a, local RF control bus coupled between the processor and the transceivers. A radio network bus is also provided and connected to the processor.

The local RF control bus is inaccessible directly from outside the multifunction slice. In contrast, the network bus is accessible directly from outside the multifunction slice. The building block or multifunction slice may provide a radio network bus connector (e.g., an IEEE-1394 bus connector) for this purpose.

The building block may also include an external control us connected to the processor. An external control bus connector then provides direct accessibility to the external control bus from outside the multifunction slice. The local RF control bus carries control data from the processor to the transceivers. The radio network bus carries voice, data, function coordination control information, and relay data between multifunction slices. The external control bus controls assets outside of the multifunction slice (e.g., antenna preconditions, antenna configuration data, and switches). The building block may enhance separation between the network bus and the local RF control bus with electromagnetic shielding to prevent undesirable radiation of unencrypted or sensitive data into space.

The transceiver-processor building block may be used in an electronic radio system multifunction slice for supporting communication threads. The multifunction slice includes a RF aperture interface, transmitters, transceivers coupled to the RF aperture interface, and a processor coupled to the transceivers. The multifunction slice also includes a local RF control bus inaccessible directly from outside the multifunction slice and connected between the processor, the transceivers, and the RF aperture.

A radio network bus couples to the processor and to a radio network bus connector that provides direct accessibility to the radio network bus from outside the multifunction slice. The multifunction slice also includes a avionics interface coupled to the processor, the avionics interface providing a core avionics output (carrying receive data, for example) and a core avionics input (carrying data to transmit, for example). In addition, the multifunction slice preferably includes an external control bus connected to the processor as well as an external control bus connector providing direct accessibility to the external control bus from outside the multifunction slice.

DETAILED DESCRIPTION OF THE INVENTION

Figure 1:
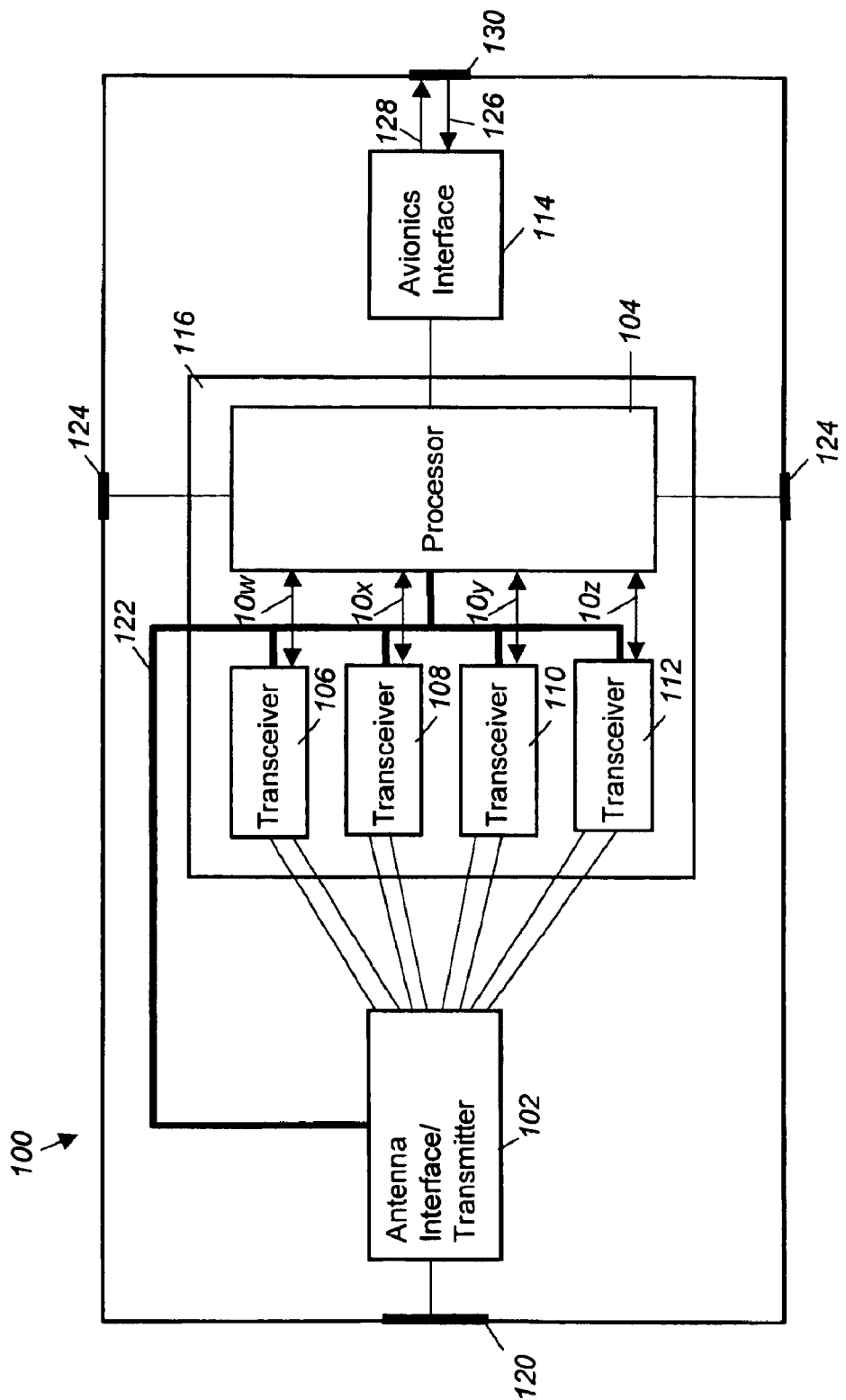
FIG. 1 illustrates an electronic radio system multifunction slice.

Turning now to FIG. 1, that figure illustrates an electronic radio system multifunction slice 100 for an electronic radio system. The multifunction slice 100 includes an antenna interface/transmitter 102, a processor 104, multi-band transceivers 106, 108, 110 and 112, and an avionics interface 114. The processor 104 and the transceivers 106, 108, 110 and 112 are shown grouped together as a transceiver-processor building block 116. The transceiver-processor building block 116 is discussed in detail below with reference to FIGS. 7 and 8. Each multifunction slice is a programmable multifunction radio identical in construction to every other multifunction slice, and, as will be described below, may be coupled together to create more complex electronic radio systems. Note that while the multifunction slice 100 is shown as having four transceivers 106, 108, 110 and 112, a multifunction slice may have greater or fewer transceivers, according to the particular application, and optimization of resource assets as described below. The core transceiver-processor building block 116 can contain as few as one transceiver, however, with the increased capabilities currently being provided and projected by DSPs, a larger number of transceivers results in a more capable, efficient and flexible design block.

The transceivers 106, 108, 110 and 112 provide transmit and receive functionality in the frequency spectrum assigned to the radio functions for which the multifunction slice 100 is responsible. The transceivers 106, 108, 110, and 112 are preferably tunable over a very wide range of frequencies while keeping the complexity (and cost) to a minimum (e.g., from LO-VHF band to L band) in order to support a wide range of radio function frequencies. Functions outside of the core frequency design bands can be implemented by providing frequency up-down converters in the antenna interface/transmitter or antenna preconditioner assets. As a result, fewer transceiver types are generally needed in each multifunction slice, thereby facilitating the size, weight, and cost benefits of the slice based architecture described in more detail below.

The antenna interface/transmitter 102 of the slice couples one or more antenna preconditioners to the transceivers 106, 108, 110 and 112. The antenna interface 102 is accessible external to the slice through the antenna connector 120. The processor 104 controls the mapping of particular antenna preconditioners to particular transceivers. This control is provided in the form of RF control signals sent from the processor 104 to the antenna interface/transmitter 102 over the local RF control bus 122.

The processor 104 is accessible external to the multifunction slice 100 at one or more radio network bus connectors 124. The multifunction slice 100 may be interconnected to one or more other multifunction slices through the network bus connectors 124. The local RF control bus 122 also connects the processor 104 to each of the transceivers 106, 108, 110 and 112 to provide control commands to transceivers 106, 108, 110 and 112. Bi-directional baseband data interfaces 10w, 10x, 10y, 10z are provided between the processor 104 and the transceivers 106, 108, 110, and 112. The processor 104 and its interconnection with other components of the electronic radio system multifunction slice 100 is discussed in detail with respect to FIGS. 7 and 8 below.

The avionics interface 114 couples the core avionics of the aircraft to the processor 104. The avionics interface provides an avionics input 126 and an avionics output 128. The avionics input 126 and output 128 are accessible at the avionics connector 130 of the electronic radio system multifunction slice 100. The avionics input 126 may be used, for example, to accept unencrypted voice or data signals that are to be encrypted and then transmitted. The avionics output 128 may provide, for example, data signals that have been received and decrypted.

Figure 2:
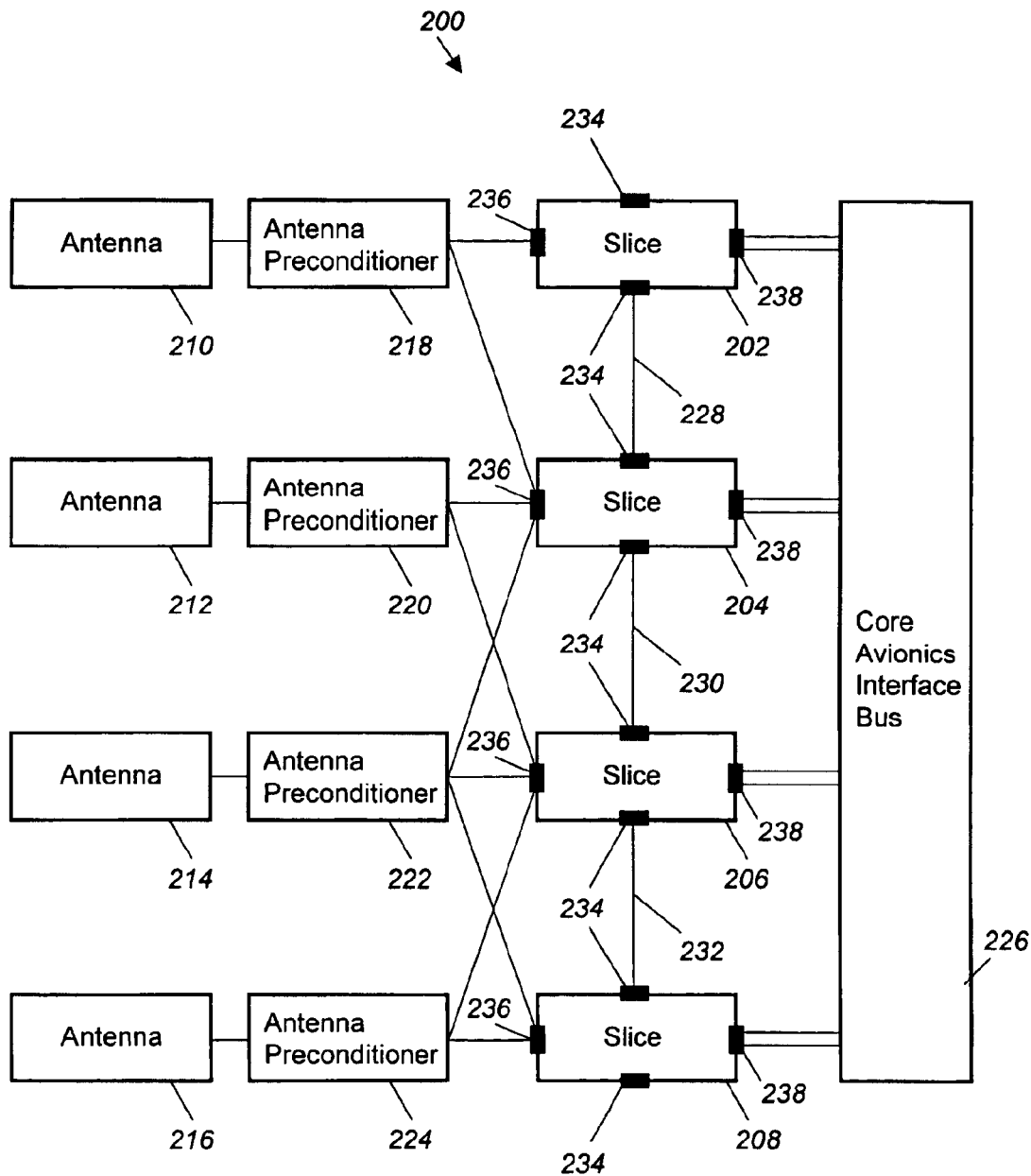
FIG. 2 illustrates a multifunction electronic radio system implemented using multifunction slices.

With reference now to FIG. 2, that figure illustrates a multifunction electronic radio system 200 composed of four multifunction slices 202, 204, 206 and 208. The heart of each slice is the transceiver-processor block. Also shown in FIG. 2 are antenna apertures 210, 212, 214, and 216, antenna preconditioners 218, 220, 222, and 224, and core avionics network bus 226.

The multifunction slices 202, 204, 206, and 208 are interconnected in accordance with the requirements of the particular bus architecture used to implement the radio network bus interface of each multifunction slice 202, 204, 206, and 208. For example, the multifunction slices 202, 204, 206 and 208, may be coupled together using IEEE- 1394 serial connections 228, 230, and 232 between the radio network bus connectors 234.

The multifunction slices 202, 204, 206, and 208 are coupled to the antenna preconditioners of the aircraft at the antenna connectors 236 of the electronic radio system multifunction slices 202, 204, 206 and 208. It is not necessary that each multifunction slice 202, 204, 206, and 208 be connected to each of the antenna preconditioners. However, connecting a particular multifunction slice to a particular antenna preconditioner allows that multifunction slice to run function threads through the preconditioner and associated antenna.

The multifunction slices 202, 204, 206, and 208 are also coupled to the core avionics network bus 226 of the aircraft at the avionics connectors 238 of the electronic radio system multifunction slices 202, 204, 206, and 208. The core avionics network bus 226 of the aircraft provides input to the multifunction slice from the rest of the aircraft. The core avionics network bus 226 also receives the output of the electronic radio system multifunction slices 202, 204, 206, and 208. The core avionics network bus 226 thereby servers as a general input/output structure that delivers information to be transmitted to the electronic radio system 200 and that delivers information received by the electronic radio system 200 to, as examples, headsets and cockpit displays, or aircraft computers and other on-board avionics.

Figure 3:
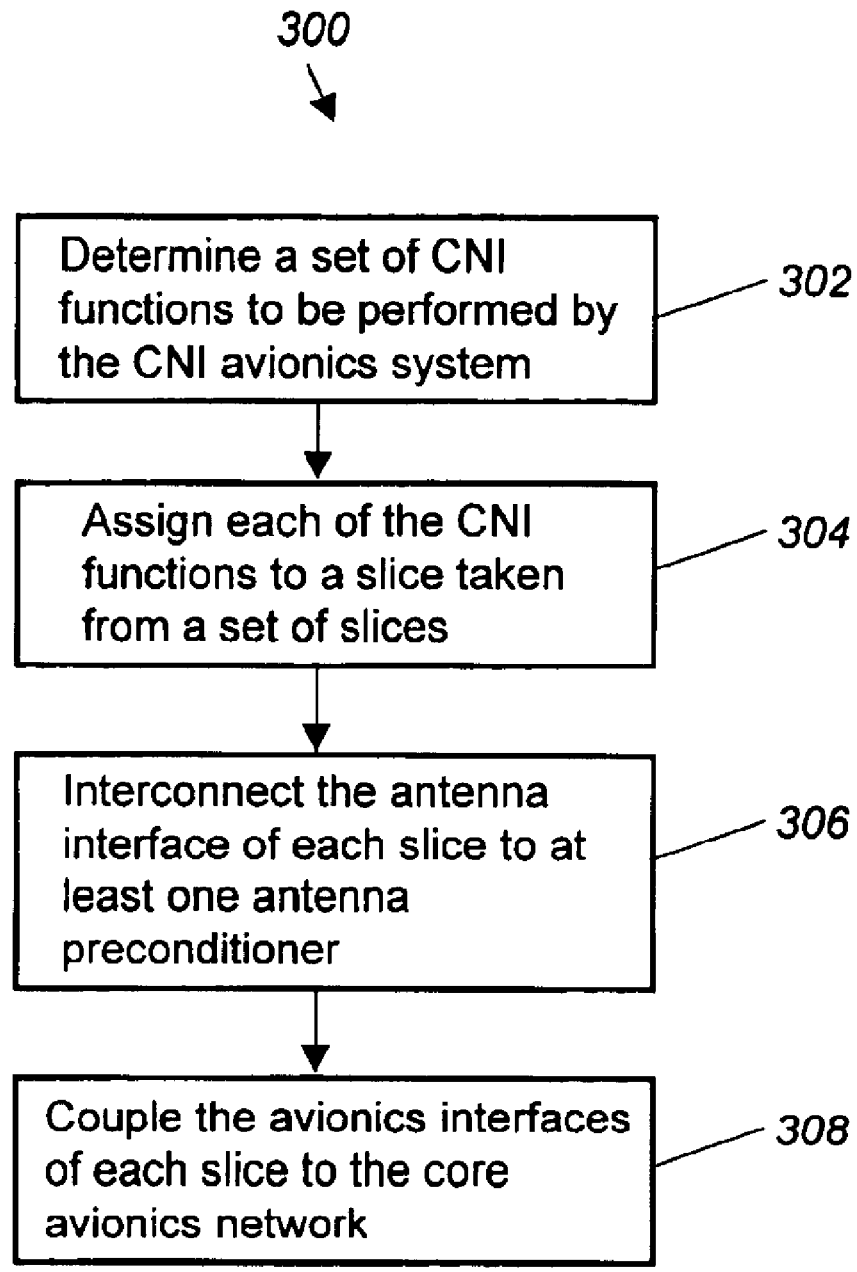
FIG. 3 shows a method for implementing a multifunction electronic radio system using multifunction slices.

Turning next to FIG. 3, that figure shows a flowchart 300 of a method of implementing a multifunction electronic radio system. At step 302, the set of radio functions to be implemented by the electronic radio system is determined. The total number of simultaneous radio functions required and the number of radio functions that each multifunction slice can implement will determine a minimum number of slices needed, given the capabilities of the transceiver-processor block being implemented within the slice. The larger the processor throughput, the more transceiver channels can be used, resulting in more functions being assigned to the slice. The transceivers used in each identical multifunction slice are of course selected to support the frequency bands used by the radio function threads. By implementing a transceiver operable over as wide frequency range as possible, fewer transceivers are generally needed in each multifunction slice.

At step 304, each of the radio functions identified in step 302 is assigned to a particular multifunction slice. At step 306, each multifunction slice is connected to each of the antenna preconditioning units associated with a radio function supported by that multifunction slice. If, for example, multiple radio functions supported by a multifunction slice share a common preconditioner, then a only single connection is preferably made to that preconditioner. At step 308, each multifunction slice is connected to the core avionics of the aircraft.

Once the multifunction slices are selected and interconnected, the processor portion of the transceiver processor block in the multifunction slices is primarily responsible for transmission and reception of voice and data over each function thread. As will be discussed in more detail below, in a multi-slice architecture one processor is assigned as a master processor and it may exercise coordination over each multifunction slices to program and reprogram the assignment of function threads to resource assets.

Figure 4:
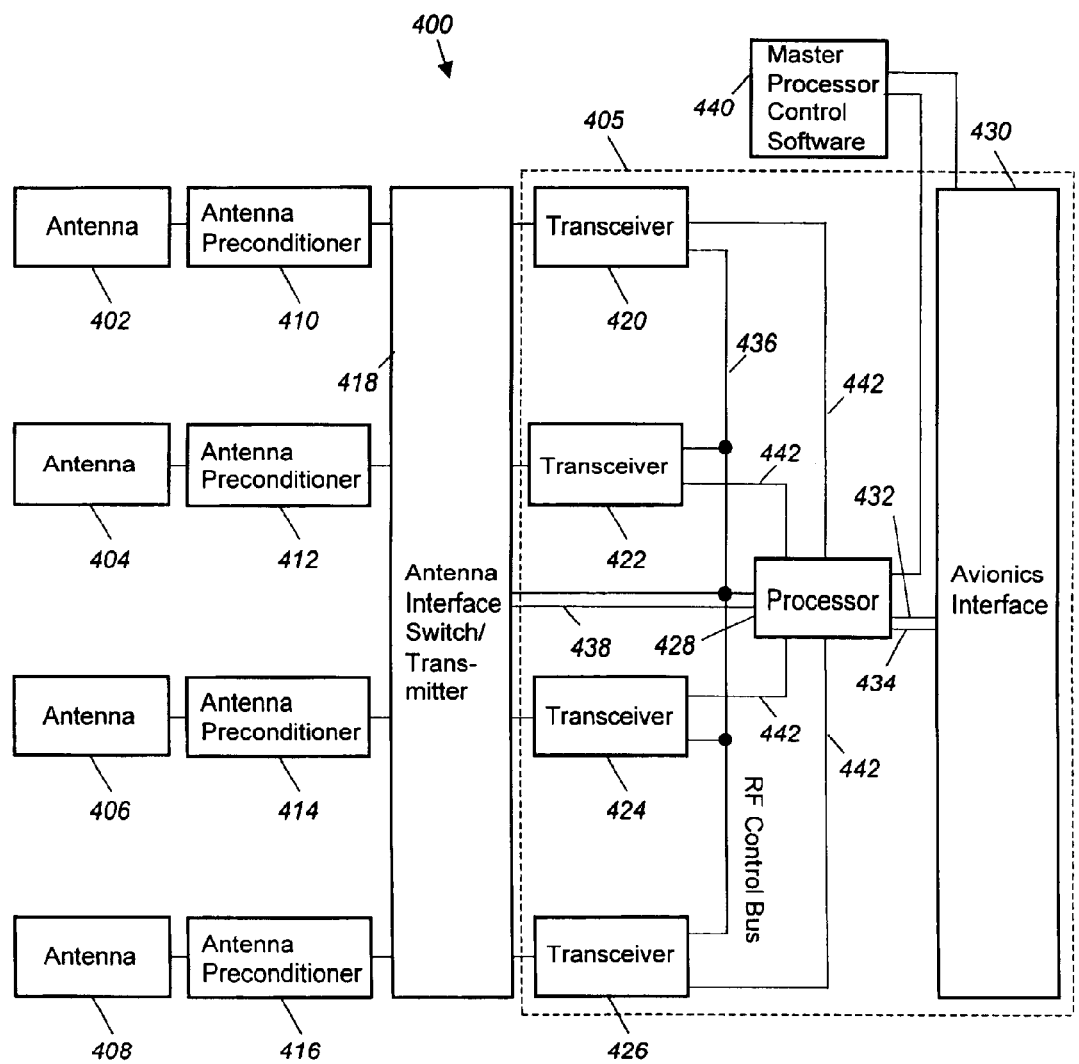
FIG. 4 illustrates an electronic radio system with reprogrammable resource assets.

Turning next to FIG. 4, that figure illustrates an electronic radio system 400 that is capable of reprogramming resource assets in real time. The electronic radio system 400 comprises antennas 402, 404, 406 and 408, antenna preconditioners 410, 412, 414, and 416, switch 418, the transceiver-processor block 405 consisting of transceivers 420, 422, 424 and 426, processor 428, and avionics interface 430. Note that in some cases the antenna preconditioner may be merely part of the RF cable, while in other cases it may contain amplifiers and filters to establish the function NF (sensitivity).

The antennas 402, 404, 406 and 408 support reception and transmission of signals at the frequencies assigned to the radio functions performed by the electronic radio system 400. While the electronic radio system 400 is shown in FIG. 4 as having four antennas, an electronic radio system may have more or fewer antennas depending on the particular function thread requirements of the electronic radio system 400. Each of the antennas 402, 404, 406, and 408 is coupled, respectively, to an antenna preconditioner 410, 412, 414 and 416.

The antenna preconditioners 410, 412, 414 and 416 are coupled to the antenna interface switch/transmitter 418. The antenna interface switch/transmitter 418 may contain, for example, a 4-by-4 switch. The interface switch/transmitter 418 may map on a one-to-one basis, or it may be capable of operating in a multicast mode. The antenna interface switch/transmitter in many cases establishes the NF (sensitivity) and pre-selection bandwidth for functions. Each of the transceivers 420, 422, 424 and 426, is also connected to the switch 418. Voice and data from each of the transceivers 420, 422, 424 and 426, is communicated to the avionics interface 430 through the processor 428 via the input connection 432 and the output connection 434 (which may be associated with a core avionics network bus connection described in FIG. 7). Note that the antenna interface switch/transmitter 418 need not be an N×N switch, and that additional switches may be provided between any of the resource assets. The processor 428 is preferably coupled to each switch provided, however, in order to support programmable function threads as described below.

The processor 428 is connected to each of the transceivers 420, 424, 426 and 428 by the local RF control bus 436. The processor 428 controls the transceivers 420, 424, 426 and 428 by sending RF control signals over the RF control bus 436, for example, to command the transceiver to tune to a particular frequency and receive data, and to the antenna interface switch/transmitter 418 to set static switches and tune filters. The processor 428 is also connected to the antenna interface switch/transmitter 418 (and any other switches provided) by means of switch control line 438, which is used for rapid switching and transmitter control. The processor 428 may then send appropriate switching control signals over the switch control line 438 to control the low latency input/output behavior of the antenna interface switch/transmitter 418. Information that is to be transmitted and received is communicated between the processor 428 and the transceivers 420, 422, 424 and 426 on the bi-directional baseband data interfaces 442.

During a particular mission segment, the processor 428 will generate RF control signals and switching control signals to create radio function threads that realize the radio functions required during that mission segment. For example, during a departure and recovery mission segment, the processor 428 generates RF control signals and switching control signals to create radio function threads to realize departure and recovery radio functions. Departure and recovery CNI functions may include, for example, voice communications, Instrument Landing Systems, indications and TACAN radio beacon acquisition.

In this respect, the processor 428 acts as a switching control unit to provide signal interconnection between resource assets to implement complete function threads. Thus, for example, in a voice transmission radio function, the processor 428 implements a path from the core avionics, through the processor (where encoding and encryption may occur), through a transceiver (where modulation, filtering, and IF amplification occur), through the antenna interface switch/transmitter 418 (where antenna connection and RF power transmission occur), to a preconditioner, and finally to an antenna for radiation into space.

When the aircraft changes mission segments, for example, to an air-to-air combat and ground attack mission segment, the processor 428 generates the RF control signals and switching control signals that create radio function threads that realize air-to-air combat and ground attack radio functions. Air-to-air combat and ground attack radio functions may include, for example, encrypted voice communications, reception on data channels over which special orders are transmitted, C-cell, narrow-band (NB) data reception (from a satellite, for example), Integrated Broadcast Services (IBS), Interrogation, IFF Transponder, Radar Altimeter, Link-16 Secure Anti-Jam Data Link and Global Positioning System threads (GPS).

The processor 428 preferably generates RF control signals and switching control signals to implement only the radio function threads required in each mission segment. As a result, the electronic radio system need include only the resource assets required to support the maximum simultaneous number of radio function threads across the mission segments. For example, assume that Table 1 represents the resource assets required in each of three mission segments A, B and C. Table 2 then shows the resource assets needed to implement the electronic radio system under prior independent resource asset design paradigms and the present reprogramable resource asset paradigm.

TABLE 1

| Mission Segment | Resource Assets Required |
| --- | --- |
| A | Q, R, S |
| B | R, S, T |
| C | R, R, S |

TABLE 2

| Design Used | Assets Required |
| --- | --- |
| Independent | Q, R, R, R, R, S, S, S, T |
| Reprogrammable | Q, R, R, S, T |

As Table 2 shows, a substantial savings in the total number of resource assets required results through reassigning the function threads to the Q, R, R, S, and T resource assets as governed by the current mission segment. In an electronic radio system designed using independent resource assets for each function thread, a total of nine resource assets are required. However, in the present real-time reprogramable electronic radio system, only five asset resources are required. A substantial decrease in the total number of resource assets leads to a direct decrease in the size, weight, power and cost requirements of the electronic radio system.

In operation, the processor 428 receives a radio function set selection signal over the radio network bus, for example. The radio function set selection signal indicates to the processor 428 which radio function threads are presently required. The processor 428 may receive the radio function set selection signal from the designated master processor control software 440, residing in the same or another slice processor, that tracks the current mission segment of the aircraft. Alternatively, the radio function set selection signal may be received over the avionics interface in response to a pilot override or selection switch.

Re-programmability of resource assets also leads to increased fault tolerance for critical radio functions. A resource asset that fails may be circumvented by the processor 428 through RF and switching control signals that implement an alternate radio function thread that avoids the failed resource asset. This reconfiguration is set into motion by the master processor control software 440 which maintains knowledge of all assets' health and activity, along with function priority lists. Depending on the total number of radio functions that may be implemented and the number of radio functions used in the current mission segment, re-threading a critical radio function may cause a non-critical (or lower priority critical) radio function to become unavailable. Priorities among the various radio functions of each mission segment may be pre-programmed in the master processor control software 440 before a mission, with radio functions re-threaded according to their priorities. Alternatively, the pilot may also assign or override priorities for the radio functions in real time using a radio function demand switch assigned to any desired radio function.

Figure 5:
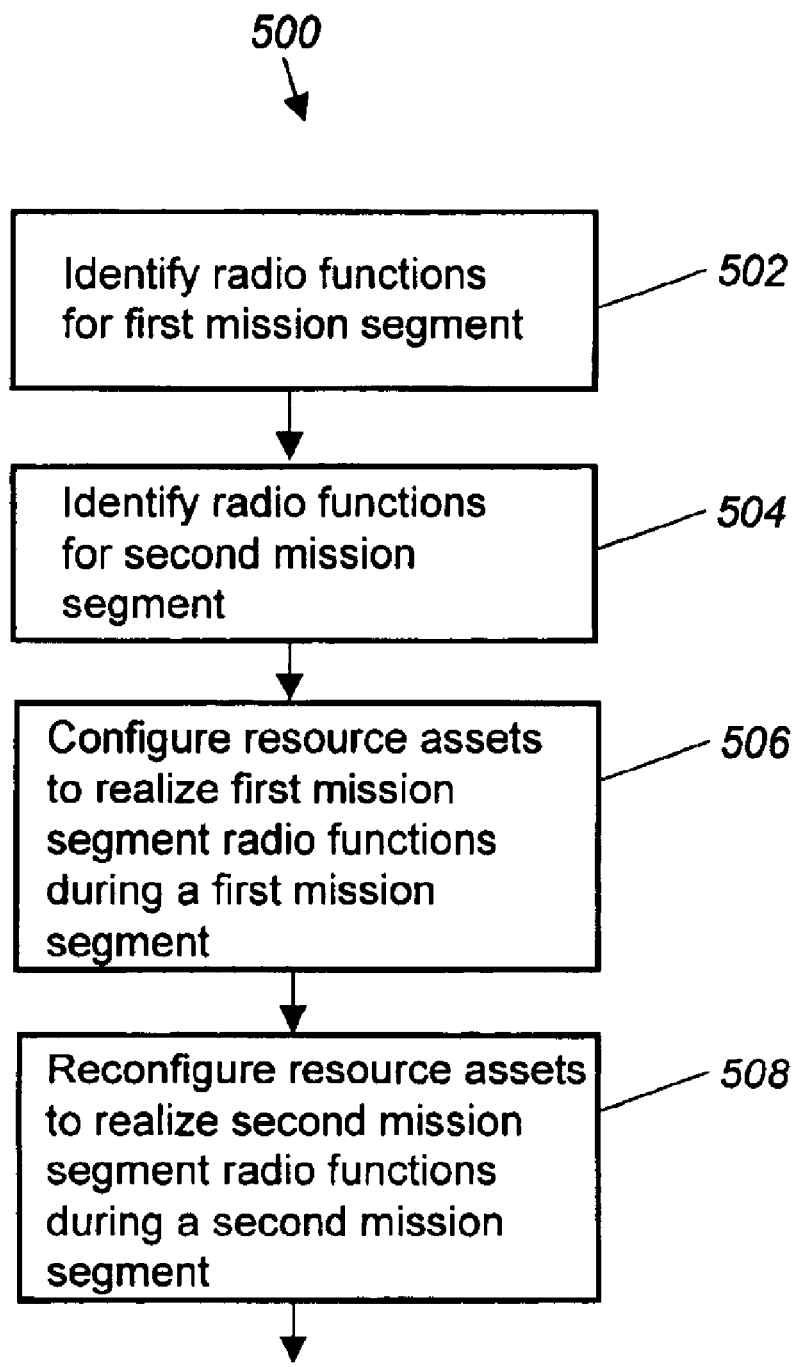
FIG. 5 shows a method for controlling a set of resource assets in an electronic radio system.

Turning now to FIG. 5, that figure shows a flowchart 500 of a method for controlling a set of resource assets in an electronic radio system. At step 502, the radio functions required during a first mission segment for the aircraft are determined. Similarly, the radio functions required during a second mission segment for the aircraft are determined (step 504).

At step 506, a set of resource assets are configured to realize the first mission segment radio functions when the aircraft is operating in the first mission segment. As noted above, the configuration may include generating RF control signals and switching control signals to create radio function threads. Subsequently, when the aircraft is operating in a second mission segment, the resource assets are reconfigured to realize the second mission segment radio functions (step 508). This process is continued for all other mission segments.

Figure 6:
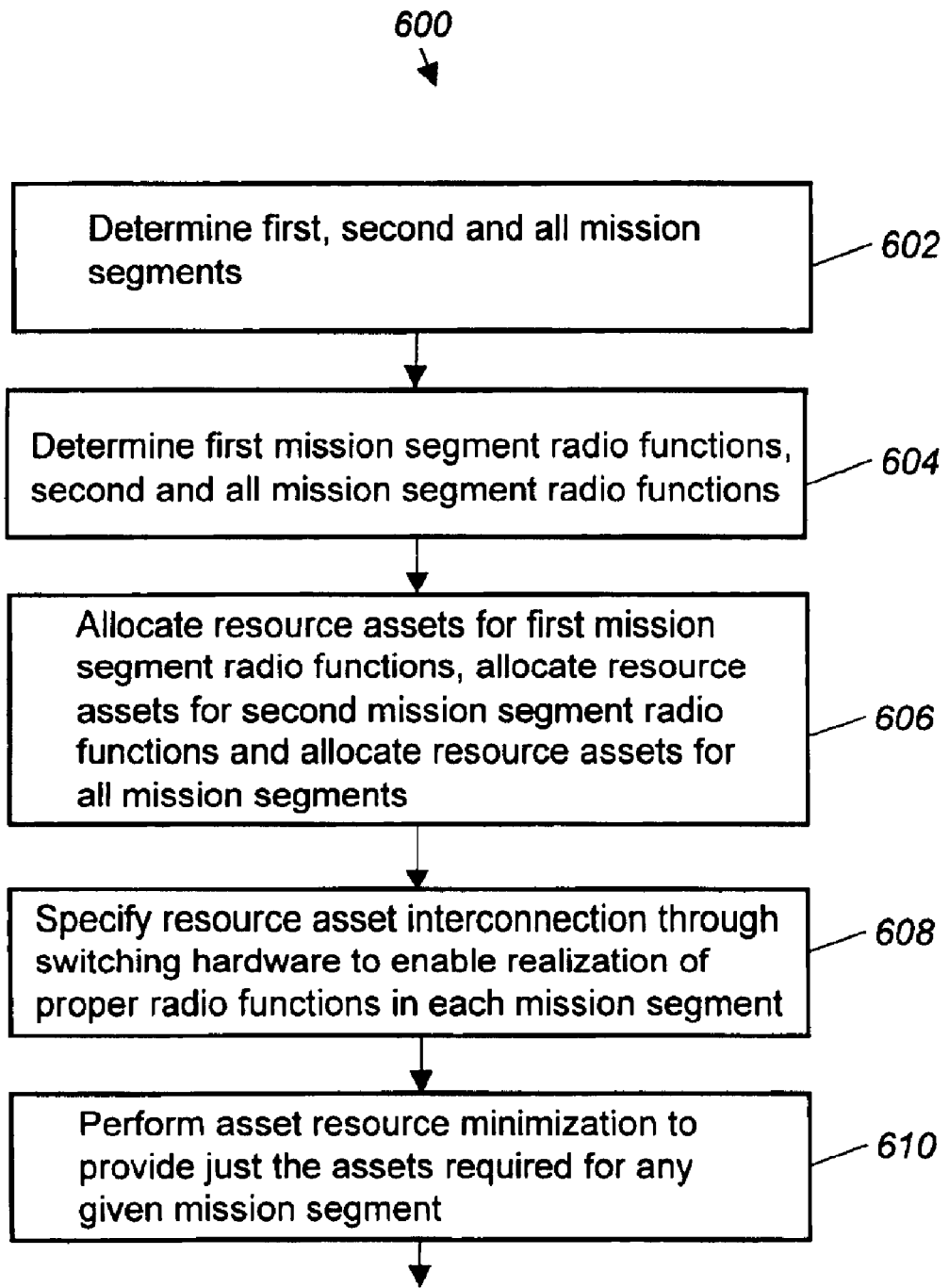
FIG. 6 shows a method for designing an electronic radio system.

With reference to FIG. 6, that figure shows a flowchart 600 of a method for designing an electronic radio system. At step 602, a first, second and all mission segments are defined. Next, at step 604, the radio functions required in each of the mission steps are determined.

An asset resource allocation is performed to determine which asset resources are needed for the first mission segment radio functions and which asset resources are needed for the second and all remaining mission segment radio functions (step 606). Next, the interconnection of resource assets through switching hardware is specified (step 608). The resource assets are connected such that all of the first mission segment radio functions are realizable during the first mission segment and all of the second mission segment radio functions are realizable during the second and all remaining mission segments.

At the resource asset minimization step 610, a minimal set of resource assets is determined (using e.g., a minimization algorithm), such that all of the radio functions associated with any one of the mission segments are simultaneously realizable using the minimal set of resource assets. Then, as additional mission segments occur, the processor 428 reprograms the radio function threads to implement the radio functions required in each additional mission segment.

Because the number of resource assets has been minimized, the electronic radio system includes no unnecessary duplication of resource assets.

Figure 7:
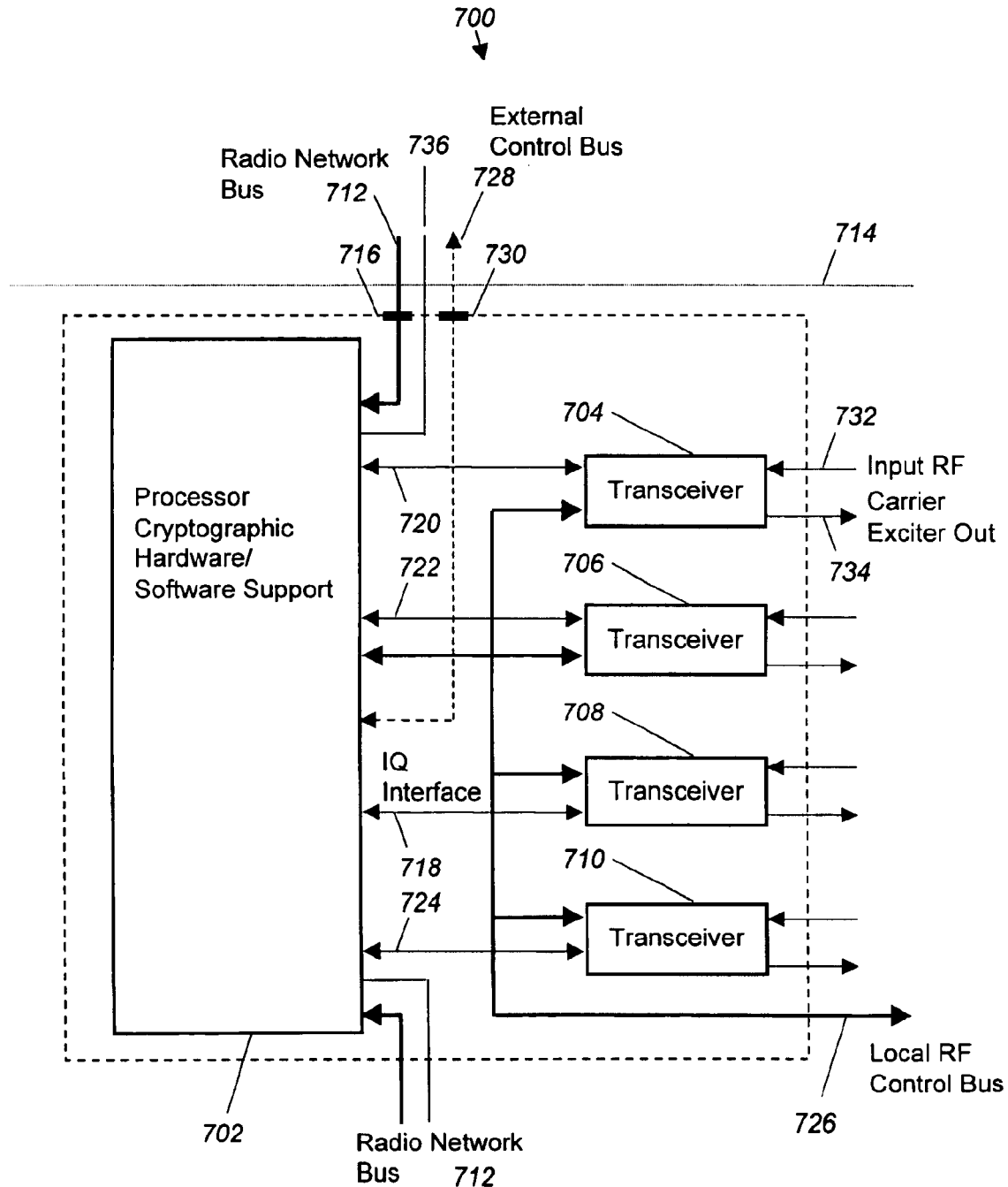
FIG. 7 illustrates a transceiver-processor building block for an electronic radio system.

Turning now to FIG. 7, that figure shows a transceiver-processor building block 700, which is the primary focus of this invention. The building block 700 includes a processor 702 coupled to multiple transceivers 704, 706, 708, 710. A radio network bus 712 connects to the processor 702 from outside the multifunction slice boundary 714 through the radio network bus connector 716. The building block 700 may be a physical hardware unit that may be inserted into a multifunction slice, for example. More generally, however, the building block 700 represents a design unit that an electronic radio system designer may, for example, retrieve from a CAD library when designing a new electronic radio system.

Inphase and Quadrature (IQ) interfaces 718, 720, 722, and 724 connect the processor 702 to the transceivers 704–710. The IQ interfaces 718–724, however, may be replaced with other data interfaces suitable for the particular modulation technique that the processor 702 employs and/or the type of implementation used for the transceivers 704–710. The building block 700 includes a local RF control bus 726 that also connects the processor 702 to the transceivers 704–710 and leaves the block 700 to control an antenna interface/transmitter unit that is within a slice, for example. Additionally, an external control bus 728 connects to the processor 702 to control assets outside of the building block 700 and is accessible from outside the multifunction slice boundary 714 through the external control bus connector 730. Each transceiver 704–710 includes a RF input (e.g., the RF input 732) and a carrier output (e.g., the carrier output 734) that connect to, for example, an antenna interface switch/transmitter unit.

The processor 702 preferably includes imbedded cryptographic support for each transceiver 704–710 in the transmit and receive directions. In one embodiment, the processor 702 executes cryptographic support software from program memory to accomplish encryption and decryption. The result is that all data Red/Black isolation and multi-level security features are all implemented within the processor 702, simplifying the overall security maintenance implementation. In an alternate embodiment, dedicated cryptographic circuits are connected to the processor 702 and the transceivers 704–710 to handle encryption and decryption. The type of encryption applied is driven by the particular application in which the building block is used, and may include, for example, support for the following encryption standards: KGV-8, KGV-10, KGV-11, KGV-23, KG-84A, KGR-96, KY-58, and Havequick Applique.

The processor 702 performs control, high-rate modem and message protocol functions for the multifunction slice in which it resides. The high-rate modem functions include preprocessing, signal processing, data processing, and cryptographic processing for simultaneously implementing multiple radio functions. Thus, a single transceiver-processor building block 702 localizes the processing that, in the past, was distributed among numerous separate modules. Such localization may be implemented using high speed analog to digital converters, high clock speed digital signal processors (DSPS), high density Field Programmable Gate Arrays (FPGAs), high density memories, integrated cryptoprocessors, and common off the shelf bus devices. Message protocol functions include message filtering and routing functionality.

The processor 702 communicates outside of its multifunction slice over the radio network bus 712. To this end, the radio network bus 712 may be implemented as a common off the shelf bus, such as an IEEE-1394 bus. Because the radio network bus 712 travels between multifunction slices, the network bus is used for inter-slice communication, command, and coordination.

In particular, the radio network bus 712 carries in most instances unencrypted, and possibly sensitive, information. The unencrypted information may include, as examples, voice, data, transmission coordination data, and radio relay data. Voice and data includes voice and data communications recovered from, or for transmission through, the transceivers 704–710. The transmission coordination data includes information concerning the ongoing operation of other multifunction slices so that the processor 702 is aware of the available assets or in-use communications frequencies and communication threads to mitigate and remove any possible cosite interference or RF asset conflict problems. Relay data includes information sent by another multifunction slice to the processor 702 for retransmission between radio bands or reprocessing.

The radio network bus 712 is preferably isolated from the local RF control bus 726, and the external control bus 728, using, for example, electromagnetic shielding 736. Isolating the network bus 712 in this manner helps to prevent unencrypted or generally sensitive information from radiating through the transceivers 704–710 or antennas directly into space. The extremely important separation of Red and Black data is implemented and controlled within the processor 702, which also provides Tempest boundary control.

The transceivers 704–710 are preferably independently tunable over a wide range of frequencies and locally implement intermediate frequency, signal bandwidth, and gain characteristics, digitization of incoming RF signals, analog conversion of outgoing RF signals, and filtering of the incoming and outgoing RF signals before or after digitization. In order to control the transceivers, the local RF control bus 726 carries control information from the processor 702. To this end, the processor 702 may provide, for example, intermediate frequency bandwidth and intermediate frequency gain characteristic configuration information for each transceiver 704–710 as determined by the predetermined need for communication threads.

The local RF control bus 726 is isolated inside the multifunction slice, and controls only the assets within it's assigned slices. In other words, the local RF control bus 726 is not directly accessible from outside the multifunction-slice that incorporates the building block 700. While information on the local RF control bus 726 may eventually work its way outside the multifunction slice after being "sanitized" by the processor 702 and through the radio network bus 712, no direct access to the local RF control bus 726 is provided.

With regard to the external control bus 728, however, the external control bus 728 may leave the multifunction slice and connect to external assets. As examples, the external control bus 728 may carry antenna and interferometer switch configuration information. Such information may be used to configure an antenna for steering an antenna beam for data link communications, for example.

Figure 8:
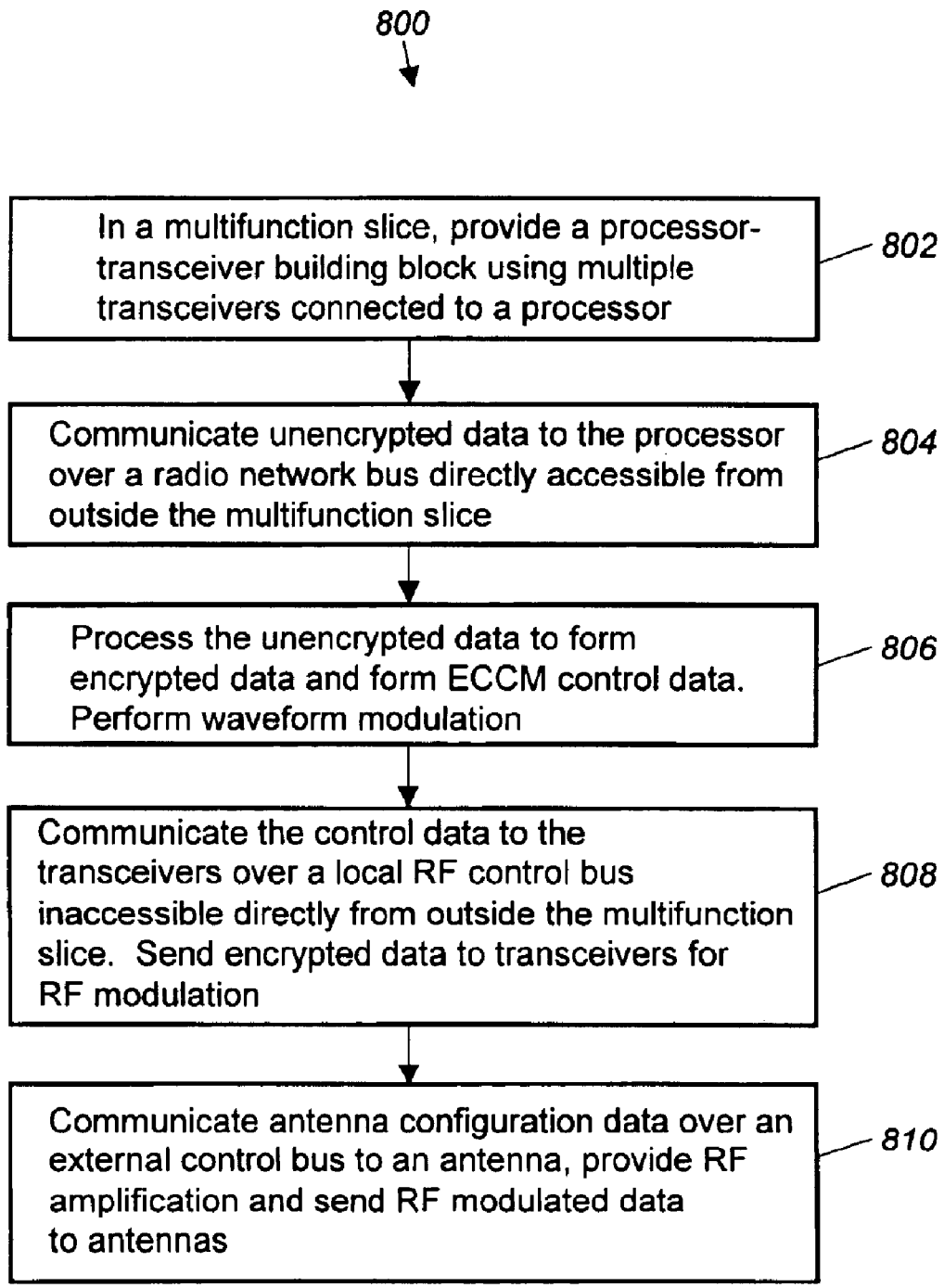
FIG. 8 shows a method for operating a transceiver-processor building block.

Turning next to FIG. 8, that figure shows a flow diagram 800 for configuring and operating a transceiver-processor building block in the transmit mode for secure and anti-jam communications. At step 802, a multifunction slice is provided that includes a transceiver-processor building block as described above (i.e., including several transceivers coupled to a processor). Next, the method communicates preferably unencrypted data over a radio network bus to the processor (step 804). As noted above, the radio network bus is accessible directly from outside the multifunction slice.

Continuing at step 806, the processor processes the data received over the radio network bus to encrypt and modulate the data, and form ECCM control data. The processor then communicates the control data to the transceivers over the local RF control bus (step 808). As noted above, the local RF control bus is inaccessible directly from outside the multifunction slice. Furthermore, as noted above, an external control bus may communicate antenna control data directly to an antenna outside the multifunction slice (step 810). For reception, the process is reversed.

Thus, the transceiver-processor building block 700 provides multiple channel radio capability that may be programmed using the radio network bus 712 and local RF control bus 726 to perform transceiver, digital processing, and cryptographic functions for a wide range of electronic radio functions. Thus, the complex and costly federated (i.e., custom) design approach to prior radio systems is avoided. In other words, the transceiver-building block 700 provides a single design unit that eliminates the need for multiple receiver, transmitter, pre-processor, signal processors, data processors, and cryptographic processors used in the past.

Note also that including cryptographic processing within the processor 702 allows the building block 700 to provide complete separation between the radio network bus 712, which contains Red (sensitive) data and the local RF control bus 726, which is connected to Black assets capable of radiation. In other words data received over the radio network bus 712 need not be propagated elsewhere before transmission, particularly not near areas of the electronic radio system that may cause the network bus data to be radiated into space. Furthermore, the independent IQ interfaces 718–724 and local RF control bus 726 greatly decreases interdependencies among radio functions, reduces the impact to the complete electronic radio system when a new radio function is added, limits radio system impacts that might otherwise be caused by an internal transceiver-processor building block failure propagating effects to other parts of the radio system, and simplifies integration and test during the development cycle.

While the invention has been described with reference to a preferred embodiment, it will be understood by those skilled in the art that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. An electronic radio system multifunction slice for supporting a predetermined number of communication threads, the multifunction slice comprising:

an RF aperture interface;

a plurality of simultaneously operable bi-directional transceivers coupled to the RF aperture interface, wherein each of the transceivers is a single module operable over a wide band of frequencies in order to support a wide range of radio function frequencies;

a processor coupled to the transceivers, to control operation of the transceivers and to process data transmitted and data received through the transceivers;

a local RF control bus inaccessible directly from outside the multifunction slice and coupled between the processor, the transceivers and the aperture interface, to provide control signals from the processor to the transceivers and the RF aperture interface;

a network bus coupled to the processor;

a network bus connector coupled to the network bus to provide direct accessibility to the network bus from outside the multifunction slice, wherein multiple multifunction slices are interconnectable through the network bus, to provide increased functionality and to form a programmable radio system capable of performing a desired set of functions; and a backplane interface coupled to the processor, the backplane interface providing a backplane output and a backplane input.

2. The electronic radio slice of claim 1, further comprising an external control bus coupled to the local RF control bus and an external control bus connector providing direct accessibility to the external control bus from outside the multifunction slice.

3. The electronic radio slice of claim 1, wherein the local RF control bus is restricted to carrying control data information between the processor, the transceivers, and the RF aperture interface.

4. The electronic radio slice of claim 1, wherein the network bus carries unencrypted information and is isolated from the local RF control bus.

5. The electronic radio slice of claim 4, wherein the network bus transfers transmission coordination data and voice data into and out of the multifunction slice, the local RF control bus carries tuning data for the plurality of transceivers, and the external: control bus carries antenna configuration data.

6. A transceiver-processor building block for use as part of an electronic radio system multifunction slice, the building block comprising:

a plurality of simultaneously operable bi-directional transceivers, wherein each of the transceivers is a single module operable over a wide band of frequencies in order to support a wide range of radio function frequencies;

a processor coupled to the transceivers, to control operation of the transceivers and to process data transmitted and data received through the transceivers;

a local RF control bus inaccessible directly from outside the multifunction slice and coupled between the processor and the transceivers to provide control signals to the transceivers;

a network bus coupled to the processor; and a network bus connector coupled to the network bus to provide direct accessibility to the network bus and, through it, to the processor from outside the multifunction slice, wherein multiple multifunction slices are interconnectable through the network bus, to provide increased functionality, and wherein multiple identical building blocks are interconnectable and programmable to form a set of multifunction slices that can be combined to form a programmable radio system capable of performing a desired set of functions.

7. The building block 6, further comprising an external control bus coupled to the processor and an external control bus connector providing direct accessibility to the external control bus from outside the multifunction slice.

8. The building block of claim 7, wherein the external control bus carries antenna interferometer configuration data.

9. The building block 7, wherein the external control bus carries antenna configuration data.

10. The building block of claim 6, further comprising encryption and decryption support circuitry coupled to the processor for each transceiver in the plurality of transceivers.

11. The building block of claim, wherein the processor includes encryption and decryption support for each transceiver in the plurality of transceivers.

12. The building block of claim 11, wherein the encryption and decryption support includes at least one of KGV-8, KGV-10, KGV-11, KGV-23, KG-84A, KGR-96, KG-125, KY-58, and Havequick Applique encryption and decryption support.

13. The building block of claim 6, wherein the network bus carries unencrypted information and is isolated from the local RF control bus.

14. The building block of claim 13, wherein the network bus transfers transmission coordination data and voice data into and out of the building block.

15. The building block of claim 13, wherein the network bus is isolated from the local RF control bus with electromagnetic shielding.

16. The building block of claim 6, wherein the local RF control bus carries tuning data for the plurality of transceivers.

17. The building block of claim 16, wherein the local RF control bus carries Intermediate frequency bandwidth Information and intermediate frequency gain characteristics for the plurality of transceivers.

18. A method for operating a transceiver-processor building block in an electronic radio system multifunction slice, the method comprising:

providing a plurality of simultaneously operable bi-directional transceivers coupled to a processor, wherein each of the transceivers is a single module operable over a wide band of frequencies in order to support a wide range of radio function frequencies;

communicating unencrypted data to the processor over a network bus coupled to the processor, the network bus coupled to a network bus connector providing direct accessibility to the network bus from outside the multifunction slice;

processing the unencrypted data to form control data;

communicating the control data to the transceivers over a local RF control bus between the processor and the transceivers, the local RF control bus being inaccessible directly from outside the multifunction slice;

providing at least one additional electronic radio system multifunction slice; and interconnecting the multifunction slices through the network bus, wherein a set of multifunction slices is combined and configured to form a programmable radio system capable of performing a desired set of functions.

19. The method of claim 18, further comprising the step of communicating antenna configuration data over an external control bus coupled to the local RF control bus to an antenna outside the multifunction slice.

20. The method of claim 18, further comprising the step of electrically isolating the network bus from the local RF control bus.

21. The electronic radio slice of claim 20, herein electrically isolating comprises electrically isolating with electromagnetic shielding.

* * * * *